United States Patent
Werner et al.

(10) Patent No.: US 7,557,930 B2
(45) Date of Patent: Jul. 7, 2009

(54) BESSEL BEAM INTERFEROMETER AND MEASUREMENT METHOD

(75) Inventors: Walter V. Werner, Pittsford, NY (US); Park E. Hays, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 592 days.

(21) Appl. No.: 10/996,930

(22) Filed: Nov. 23, 2004

(65) Prior Publication Data

US 2006/0109476 A1 May 25, 2006

(51) Int. Cl.
*G01B 11/02* (2006.01)
*G01B 9/02* (2006.01)

(52) U.S. Cl. .................................. 356/496; 356/521

(58) Field of Classification Search ................ 356/477, 356/479, 497, 511–515, 498, 521, 496
See application file for complete search history.

(56) References Cited

U.S. PATENT DOCUMENTS

| | | | | |
|---|---|---|---|---|
| 5,081,995 | A * | 1/1992 | Lu et al. ..................... | 600/459 |
| 5,943,161 | A * | 8/1999 | Shinozaki et al. ........... | 359/330 |
| 6,552,864 | B1 * | 4/2003 | Ruschin ...................... | 359/894 |
| 6,580,540 | B1 * | 6/2003 | Palese ......................... | 398/102 |
| 6,687,010 | B1 * | 2/2004 | Horii et al. .................. | 356/479 |
| 7,072,045 | B2 * | 7/2006 | Chen et al. .................. | 356/479 |
| 7,151,632 | B2 * | 12/2006 | Biss et al. ................... | 359/371 |
| 2004/0109164 | A1 * | 6/2004 | Horii et al. .................. | 356/479 |
| 2006/0082882 | A1 * | 4/2006 | Wang et al. .................. | 359/558 |
| 2006/0109476 | A1 * | 5/2006 | Werner et al. ............... | 356/477 |
| 2007/0051706 | A1 * | 3/2007 | Bovatsek et al. ........ | 219/121.69 |

OTHER PUBLICATIONS

Arlt et al. "Generation of high-order Bessel beams by use of an axicon" Apr. 15, 2000, Optical Communications 177, pp. 397-301.*
Jarutis et al. "Focusing of Laguerre-Gaussian beams by axicon" Oct. 1, 2000, Optical Communications 184, pp. 105-112.*

* cited by examiner

*Primary Examiner*—Patrick J Connolly
(74) *Attorney, Agent, or Firm*—William Greener; Bond, Schoeneck & King, PLLC

(57) ABSTRACT

A measurement method and apparatus rely upon the coherent optical interference between a reference beam and a diffractionless sensing beam having an optical path length that has been disturbed. The interference pattern can be analyzed to determine a measurement parameter of the disturbance. The diffractionless beam is particularly a Bessel beam. Exemplary optical interferometer types including Mach-Zehnder, Michelson, Sagnac and Fabry-Perot include a Bessel beam generator to generate a diffractionless beam as the sensing optical beam and in some aspects the reference optical beam of the interferometer. The sensing optical beam propagates along a sensing optical beam path in free-space. The reference optical beam path may be a free-space medium or a material medium such as an optical fiber. The sensing optical beam path is subject to a disturbance manifested by the optical interference pattern between the sensing optical beam and the reference optical beam. Parameters of the disturbance, such as motion, acoustics, environmental conditions and others can be determined by analysis of the interference pattern.

34 Claims, 6 Drawing Sheets

BESSEL BEAM INTERFEROMETER AND MEASUREMENT METHOD

BACKGROUND OF THE INVENTION

1. Field of the Invention

Embodiments of the invention generally pertain to the field of signal measurement and, more particularly, to optical interferometric measurement methods and apparatus utilizing a diffraction less optical beam such as a Bessel beam.

2. Description of Related Art

Optical interferometers of various configurations, e.g., Michelson, Mach-Zehnder, Sagnac, Fabry-Perot and others have been known for many years. These devices are used to detect and measure the optical interference produced by interfering light beams. The resulting interference pattern can be analyzed to measure a parameter of a disturbance affecting the path length of a sensing beam component with respect to a reference beam component of the interferometer.

The phenomenon of optical interference depends on the phase relationship between the interfering beams of light. When coherent beams interfere, this phase relationship produces constructive or destructive interference resulting in light and dark fringes, which can be analyzed in various known ways. Waves that are incoherent, when combined, produce rapidly moving areas of constructive and destructive interference and therefore do not produce a visible interference pattern. Light can be temporally coherent and/or spatially coherent. The temporal coherence of light is related to the spectral bandwidth of the source of the light. Thus a truly monochromatic or single frequency light transmission (wave) would have an infinite coherence time and coherence length. Spatial coherence, on the other hand, is the ability of any one spatial position of the wavefront of light to interfere with any other spatial position of the wavefront. Lasers emit light that typically has a high degree of both temporal and spatial coherence. Because some lasers emit highly collimated light, or the laser beam can easily be collimated, substantially plane wavefronts can be generated, which themselves have a high degree of spatial coherence. Therefore, lasers are used as the principle type of light source for most interferometers. However, due to the phenomenon of diffraction, a perfect or infinitely collimated beam cannot exist. Diffraction can be expresssed as the apparent bending and spreading of waves when they meet an obstruction. Diffraction also occurs, for example, when a group of light waves of a finite size propagates through a medium such as free-space, causing the 'collimated' laser beam to eventually spread out as it travels farther from the source of the light.

Furthermore, a collimated laser beam typically has a Gaussian cross sectional intensity profile. The amplitude of the electric field of a Gaussian beam can be expressed by the following equation $$E(x,y,z) = E_0(\omega_0/\omega_z)[\exp{-i[(2\pi nz/\lambda)-n(z)]-r^2[\omega^{-2}+(i\pi n/\lambda R(z))]}] \quad (1)$$

where $[2\pi nz/\lambda)-n(z)]$ represents a longitudinal phase term and $(i\pi n/\lambda R(z))$ represents a radial or transverse phase term. In applications requiring the propagation of a coherent beam through free-space, and subsequent detection, atmospheric turbulence and diffraction effects, for example, cause random fluctuations in these phase terms, which affect the quality of the propagating beam. These phase fluctuations ultimately limit the performance of optically based detection systems. In the exemplary application of coherent free-space sensing, random phase fluctuations induced by the atmosphere severely threaten the performance of coherent detection systems, especially at low frequencies. Various approaches to mitigating these effects, including the use of array receivers, multiple wavelengths, larger beam diameter, phase conjugation, beam propagation height adjustment, and others, have inherent disadvantages of their own. They include high cost, increased noise sensitivity, significant technical development effort and others.

In view of the foregoing, the inventors have recognized the need for a free-space beam propagation measurement method and apparatus that overcome these known disadvantages and others. Accordingly, embodiments of the invention are directed to interferometers and measurement methods that address the recognized shortcomings of the current state of technology, and which provide further benefits and advantages as those persons skilled in the art will appreciate.

SUMMARY OF THE INVENTION

An embodiment of the invention is directed to a device for measuring the optical interference between multiple light beam components. The device includes an optical source that generates a quasi-coherent or coherent optical source beam, a means for generating the multiple light beam components, which coherently interfere to produce an interference pattern, a means for modulating the phase of either or both of the light beam components, a detector suitably positioned to detect the interference pattern, a demodulator, and a non-diffracting beam generator located in an optical path of the device for generating a substantially non-diffracting beam as at least one of the multiple light beam components. In a particular aspect, the non-diffracting beam generator is a Bessel beam generator as those devices are known by a person skilled in the art. In various alternative aspects, additional components of the device include an optical isolator, e.g., a Faraday rotator, quarter-wave-plate, or other optical isolator known in the art, and means for combining the interfering light beam components if they are not directly propagated into the detector. Beam combiners may include bulk optics such as a partially transmitting mirror, a fiber-pigtailed component, various commercially available off-the shelf components and others known in the art.

A person skilled in the art will readily appreciate that the device embodiment can generally be considered an optical interferometer. Exemplary aspects of the embodiment include a Mach-Zehnder interferometer, a Michelson interferometer, a Sagnac interferometer, and a Fabry-Perot interferometer. The embodied invention, however, should not be considered to be limited to these illustrative aspects; rather, the device embodiment contemplates the generation and detection of optically interfering beams, one of which is a substantially non-diffracting beam in free-space. A Bessel beam may be considered as a particularly exemplary non-diffracting beam. The optically interfering beams in an interferometer generally propagate along a reference optical path and a sensing optical path, and this terminology will be understood by a person skilled in the art to suitably apply to Sagnac and Fabry-Perot configurations as well as their more conventional usage with Michelson and Mach-Zehnder configurations. In various aspects, the reference path, sensing path, or both may appropriately comprise free-space or a material medium such as, e.g., optical fiber. In an aspect, the device may include an aperture for selectively propagating a desired intensity or phase distribution of the sensing or reference beam, or both. For example, a suitable aperture may be used to transmit only a central region of a Bessel beam, a hollow beam or a zero-order beam.

Device aspects of the invention have numerous applications as, including but not limited to, an acoustic sensor, a temperature sensor, a motion sensor, a wake vortex sensor, a vibration sensor, and others in which a measurement parameter can be determined by coherent optical detection. In applications requiring the propagation of a coherent beam through free-space, and subsequent detection, atmospheric turbulence and diffraction effects, for example, cause random phase fluctuations, which affect the quality of the propagating beam. These phase fluctuations ultimately limit the performance of optically based detection systems. In the exemplary application of coherent free-space sensing, random phase fluctuations induced by the atmosphere severely threaten the performance of coherent detection systems, especially at low frequencies. Non-diffracting beams, such as Bessel beams, when utilized in various interferometric configurations, provide increased resistance against phase distortions caused by atmospheric turbulence.

Another embodiment of the invention is generally directed to a measurement method in which the coherent interference between a disturbed, non-diffracting, 'sensing' optical beam and a 'reference' optical beam is detected and processed to determine a particular measurement parameter of the disturbance. In a particular aspect, the non-diffracting optical beam is a Bessel beam. In a principle aspect, the method includes the steps of providing an at least partially coherent optical source beam, providing a reference optical beam from the source beam, providing a sensing optical beam from the source beam, wherein the sensing optical beam is a substantially non-diffracting beam in free-space, exposing the sensing optical beam to a disturbance that changes the optical path length of the sensing optical beam, interfering the disturbed sensing optical beam and the reference optical beam to generate an optical interference signal, and determining a measurement parameter of the disturbance from the optical interference signal. In a particular aspect, a Bessel beam is provided as the sensing optical beam. In various aspects, the sensing optical beam and the reference optical beam may have optical path lengths that are equal or not equal. A free-space medium or a suitable material medium such as an optical fiber, for example, may be provided for the sensing optical beam and/or the reference optical beam. In various aspects, the source beam and/or the sensing optical beam and/or the reference optical beam may be modulated in phase, wavelength or intensity. In another aspect, an aperture may be provided to propagate a desired phase and/or intensity distribution of the sensing optical beam and/or the reference optical beam.

The foregoing and other objects, features, and advantages of embodiments of the present invention will be apparent from the following detailed description of the preferred embodiments, which make reference to the several drawing figures.

DETAILED DESCRIPTION OF PREFERRED EMBODIMENTS OF THE INVENTION

Figure 1:
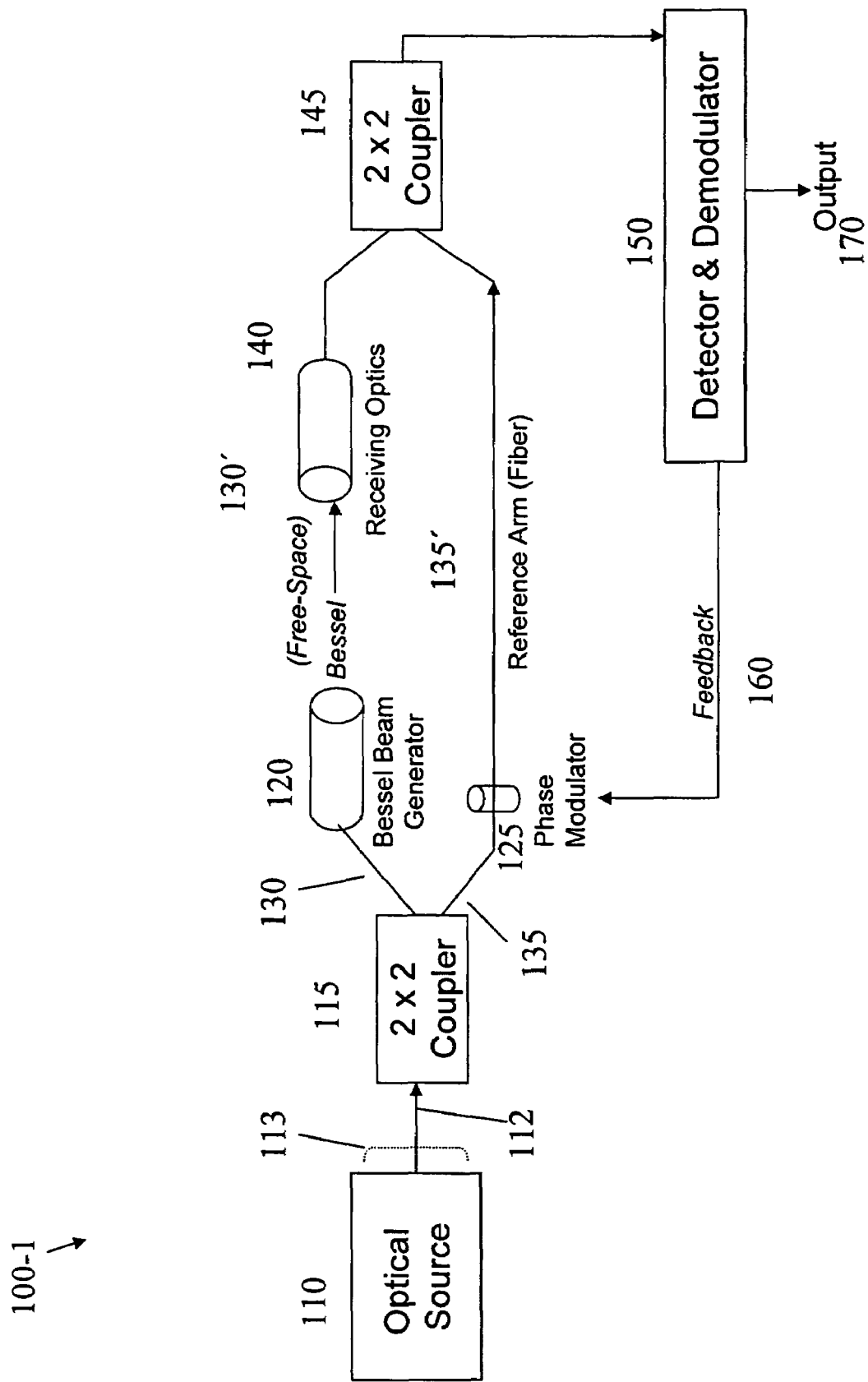
FIG. 1 is a schematic diagram illustrating a Bessel beam interferometer according to an exemplary embodiment of the invention.

Embodiments of the invention are directed to apparatus and measurement methods that rely on the coherent optical interference between a reference optical beam and a (disturbed) sensing optical beam that is characterized as being diffractionless; i.e., the beam can propagate over a distance of several meters or more without changing in size. The practical realization of a diffraction less beam is a Bessel beam. The generation of a Bessel beam and the characteristics of such a beam are well know in the art and are not discussed in further detail herein other than to note, first, that such a beam can propagate without spreading in the transverse dimension over distances that can exceed by orders of magnitude the Rayleigh range of a Gaussian beam of the same initial full width at half maximum (FWHM); and second, that a Bessel beam, represented mathematically as $$E(x,y,z)=E_0[\exp+i[(2\pi n \cos \theta z/\lambda)]]J_0[2\pi n \sin \theta R/\lambda] \qquad (2)$$

where $[(2\pi n \cos \theta z/\lambda)$ represents the longitudinal phase term (see equ. (1)), has no transverse phase term and thus no transverse phase sensitivity; i.e., it is non-diffracting. For further information about the generation and characteristics of Bessel beams, the interested reader is referred to Lin et al., Experimental investigation of Bessel beam characteristics, *Applied Optics*, 31, 15, pp 2708-2713 (20 May 1992), Herman and Wiggins, Production and uses of diffraction less beams, *J. Opt. Soc. Am. A*, 8, 6, pp 932-942 (June 1991), and Durnin et al., Comparison of Bessel and Gaussian beams, *OPTICS LETTERS*, 13, 2, pp 79-80 (February 1998), all of which are hereby incorporated by reference in their entireties to the fullest allowable extent.

An embodiment of the invention is directed to a coherent optical measurement method. The method includes the step of providing a quasi-coherent or coherent optical source beam. A laser emitting a desired wavelength range, laser diode, LED or other source that may include auxiliary optics will represent a suitable light source as one skilled in the art will understand. An exemplary light source is a laser emitting at 1.3μ or 1.5μ.

The source beam is provided to generate a reference optical beam that traverses a reference optical beam path having a path length $L_R$. A sensing optical beam is also produced from the source beam that traverses a sensing optical beam path having a path length $L_S$. $L_R$ and $L_S$ may be equal or not. The sensing optical beam path will typically be provided by a free-space medium. The reference optical beam path may be a free-space medium or a suitable material medium, e.g., optical fiber. Any of many known forms of beam dividers including bulk optics, fiber-based couplers, and others may be used to spatially split the source beam. Electronic gating may present a viable beam splitting alternative. The sensing optical beam will typically have a Gaussian or Laguerre-Gaussian cross sectional intensity profile when generated by a laser source. The sensing optical beam is then transformed into a Bessel beam as known in the art. In applications requiring the propagation of a coherent beam through free-space, and subsequent detection, atmospheric turbulence and diffraction effects, for example, cause random fluctuations in these phase terms, which affect the quality of the propagating beam. These phase fluctuations ultimately limit the performance of optically based detection systems. In the exemplary application of coherent free-space sensing, random phase fluctuations induced by the atmosphere severely threaten the performance of coherent detection systems, especially at low frequencies. Non-diffracting beams, such as Bessel beams, when utilized in various interferometric configurations, provide increased resistance against phase distortions caused by atmospheric turbulence.

The sensing optical beam is then disturbed by an environment that changes the sensing optical beam path length by an amount $\Delta L_S$. It will be appreciated that depending upon the type of interferometric device used to make the measurement (discussed in detail below), the sensing beam itself or a sensing beam component such as a mirror, for example, can be disturbed to create the change in sensing beam optical path length. The disturbed sensing beam is coherently interfered with the reference beam to generate an interference pattern. The interfering beams may be directly propagated to a detector. Alternatively, receive optics may be employed to collect and combine the interfering beams at the detector. Various known receive optics include, but are not limited to, simple pinhole apertures, spatial light modulators or CCDs in combination with lenses, pigtailed couplers, GRIN lenses, fiber couplers and/or other physical, electronic, optoelectronic or bio-optical components. The interference pattern can then be analyzed as known in the art to determine a measurement parameter of the source of the disturbance. It may be desirable to controllably modulate a phase component of the sensing beam and/or the reference beam, or to modulate the wavelength of the source beam.

In an exemplary aspect, the measurement method includes the step of aperturing the sensing optical beam to propagate a selected light distribution of the sensing optical beam such as only a central bright region of the Bessel beam.

Another embodiment of the invention is directed to a device for measuring the optical interference between multiple light beam components. Device embodiments of the invention having numerous measurement applications including, but not limited to, a wake vortex sensor for aeronautical application, an acoustic sensor, a temperature sensor, a motion sensor, and other parametric sensors relating to environmental, oceanic, geological and other measurement environments.

FIG. 1 illustrates a first exemplary device embodiment of the invention in the form of a balanced path length Mach-Zehnder interferometer 100-1. An optical source 110 such as a laser generates an at least partially coherent optical source beam 112. An external optical isolator 113 may optionally be used in conjunction with the optical source. The source beam is input to a 2x2 fiber coupler 115 that divides the source beam 112 into a sensing optical beam 130 and a reference optical beam 135, which respectively traverse a sensing optical beam path 130' and a reference optical beam path 135', which, in this aspect, have equal optical path lengths ($L_S=L_R$). In the illustrative embodiment 100-1, the reference optical beam 135 propagates over a fiber optic beam path 135'. A phase modulator 125 is shown in the reference optical beam path 135', but could alternatively be located in the sensing optical beam path 130' or in both optical beam paths. The sensing optical beam 130 output by coupler 115 will typically have a Gaussian or quasi-Gaussian intensity profile. This output is input to a Bessel beam generator 120, which generates a substantially non-diffracting sensing beam that traverses a free-space beam path 130'. This sensing beam path 130' will be subject to a disturbance that in one way or another changes the sensing optical beam path length by an amount $\Delta L_S$. The disturbed sensing beam is sent through receiving optics 140 that may comprise, for example, a simple pinhole aperture, a spatial light modulator, CCD or other component in combination with bulk, GRIN or other type of lens, pigtailed or otherwise coupled to a fiber or into a combiner 140 or detector 150. Special apertures may be incorporated in either or both of the sensing and reference beam paths for propagating a selected light distribution. As shown, a beam combiner 145 in the illustrative form of a 2x2 fiber coupler combines the interfering beams, which are output to a detector and demodulator 150. A feedback loop 160 is provided as shown. The detected/demodulated signal is output at 170 for analysis. It will be appreciated that the disturbed sensing optical beam and the reference optical beam could be directly input to detector 150 to detect their interference.

Figure 2:
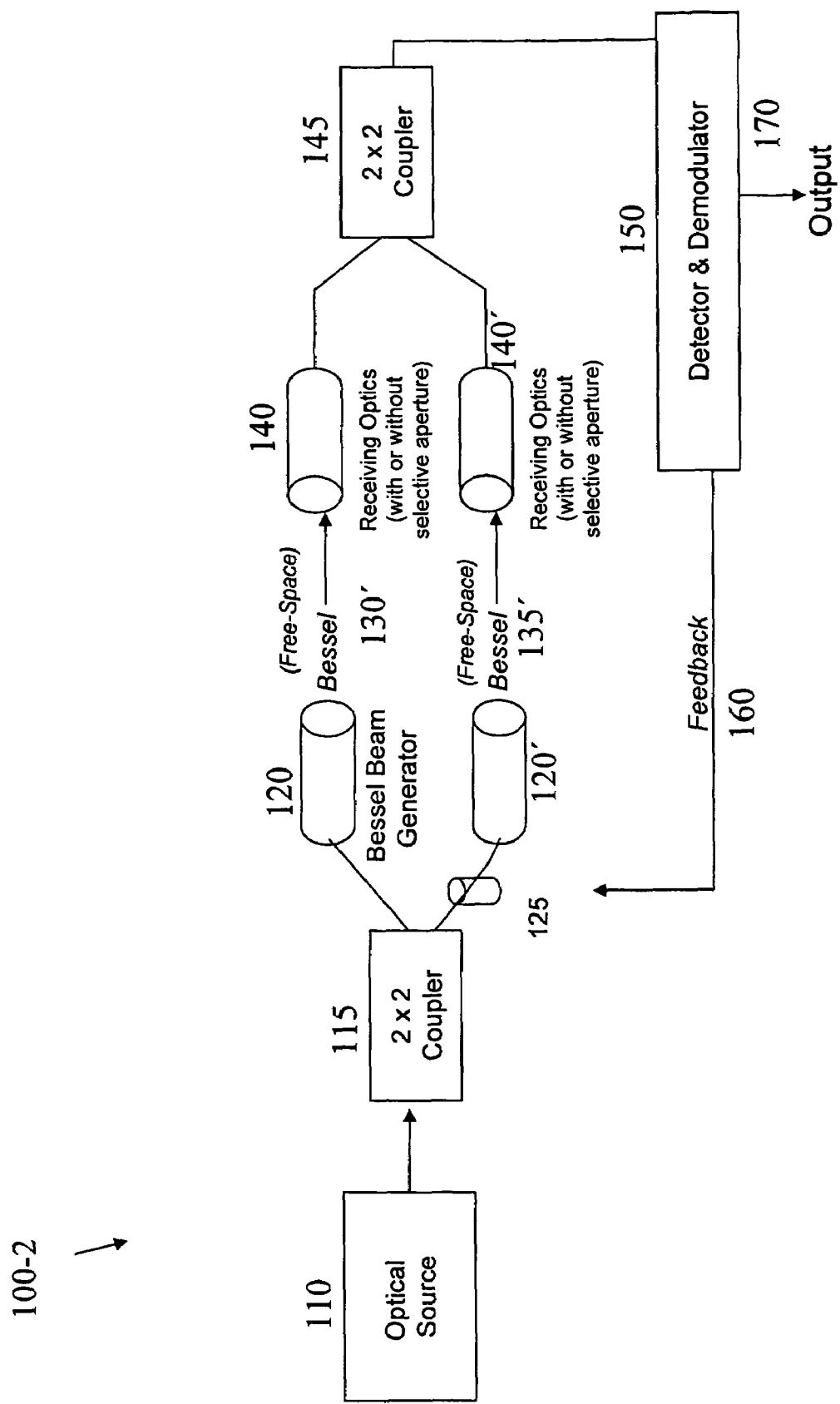
FIG. 2 is a schematic diagram illustrating an alternative aspect of the Bessel beam interferometer illustrated in FIG. 1.

FIG. 2 shows an alternative aspect 100-2 of the Mach-Zehnder interferometer illustrated in FIG. 1. As shown in FIG. 2, both the sensing optical beam path 130' and the reference optical beam path 135' are free-space media propagating diffraction less Bessel beams. The disturbed sensing beam and the reference beam are transmitted through respective receiving optics 140, 140' to a beam combiner 145 and into detector/demodulator 150. Interference signal 170 is output for analysis of the disturbance.

Figure 3:
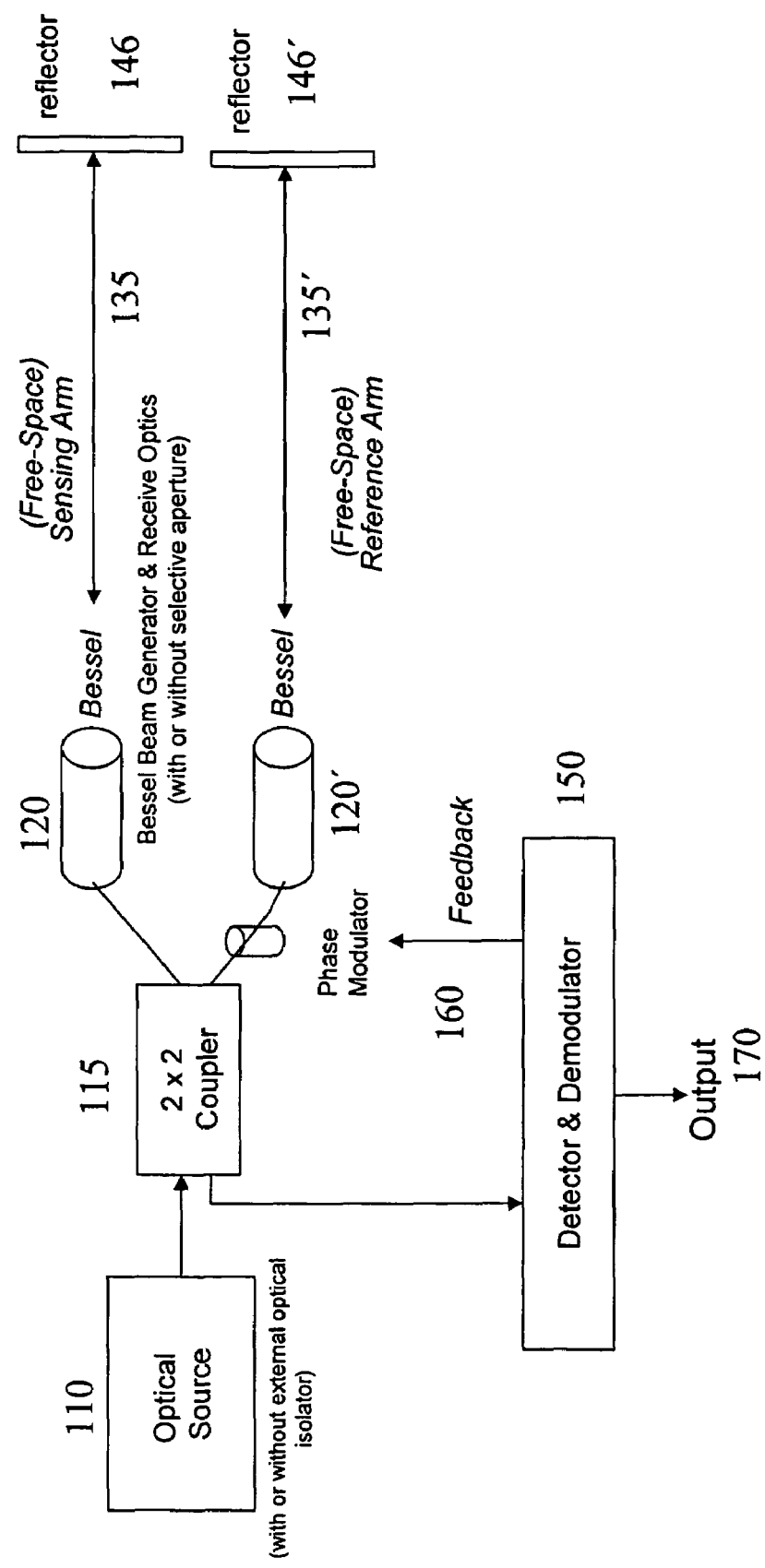
FIG. 3 is a schematic diagram illustrating a Bessel beam interferometer according to another exemplary embodiment of the invention.

FIG. 3 shows another exemplary interferometer embodiment 100-3 in the form of a balanced path length Michelson interferometer having a free-space reference beam path medium 135'. Similar to the embodiments illustrated in FIGS. 1 and 2, Michelson interferometer 100-3 includes an optical source 110 that generates a quasi-coherent or coherent optical source beam 112 with or without an external optical isolator 113, a beam divider 115 in optical communication with the optical source beam, which provides a sensing optical beam 130 and a reference optical beam 135, having equal path lengths ($L_S=L_R$). A phase modulator 125 is located in the reference optical beam path as illustrated. In the instant embodiment 100-3, a Bessel beam generators 120, 120' are respectively located in the sensing optical beam path 130' and the reference optical beam path 135', both of which are free-space media, to generate diffraction less beams. Exemplary Cat's Eye retroreflectors 146, 146' are provided to return the disturbed ($\Delta L_S$) sensing beam and the reference beam to beam combiner 115, whence their interference pattern is sent into the detector/demodulator 140. As in the previously described embodiments 100-1, 100-2, the device may further include receiving optics, which may have an aperture component for propagating a selected light distribution, or other electrooptical components. As shown, a feedback loop 160 is provided between an output point and an input point of the interferometer.

Figure 4:
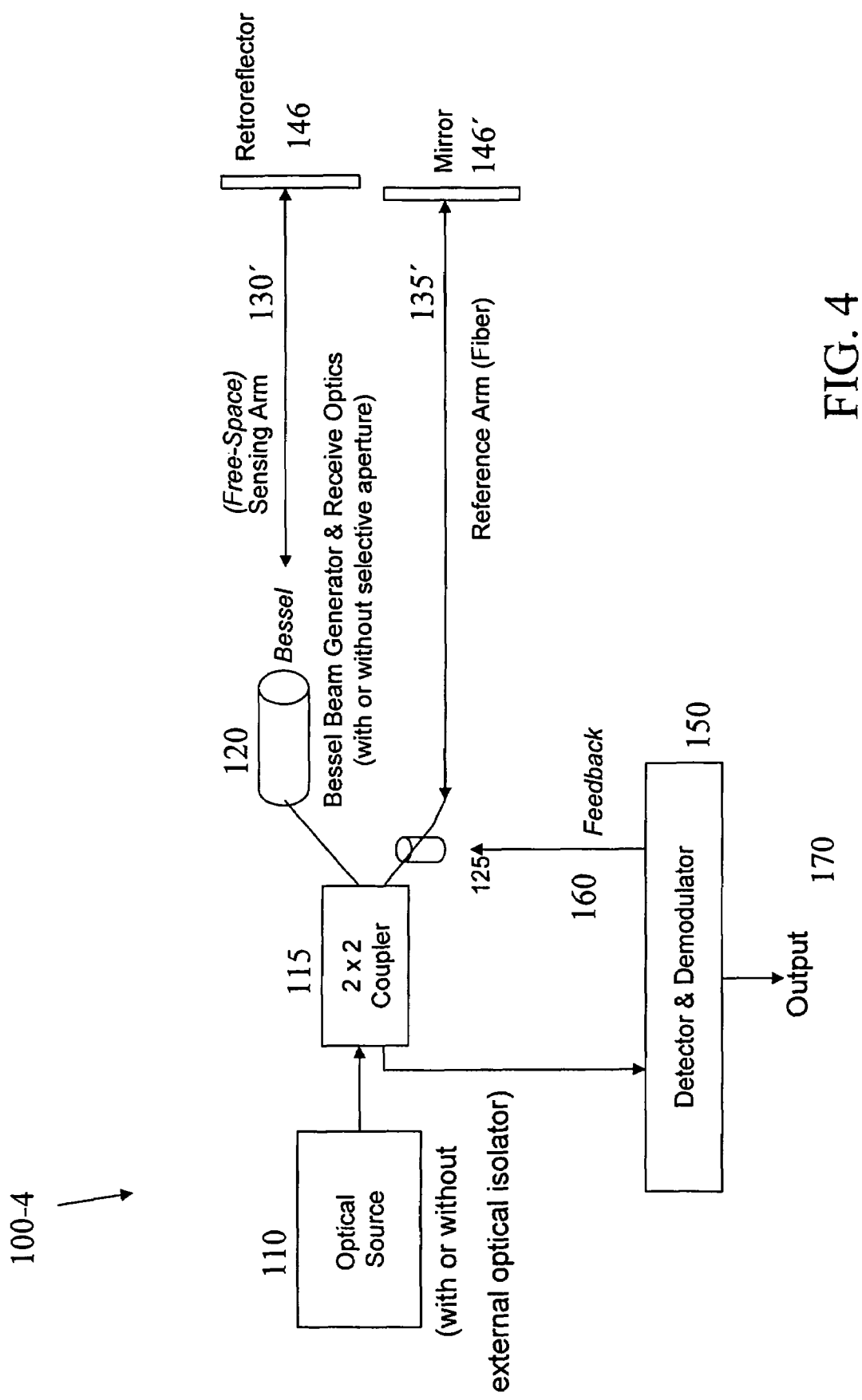
FIG. 4 is a schematic diagram illustrating an alternative aspect of the Bessel beam interferometer illustrated in FIG. 3.

FIG. 4 illustrates an alternative aspect 100-4 of the Michelson interferometer 100-3 shown in FIG. 3. In the instant aspect, the Michelson interferometer includes an optical fiber medium for reference optical beam path 135' for propagating the reference optical beam 135. Reflector 146' in this aspect is not necessarily a retroreflector as illustrated in the exemplary embodiment of FIG. 3, but rather may be any fiber reflection means including a polished fiber end or reflective component as well known in the art.

Figure 5:
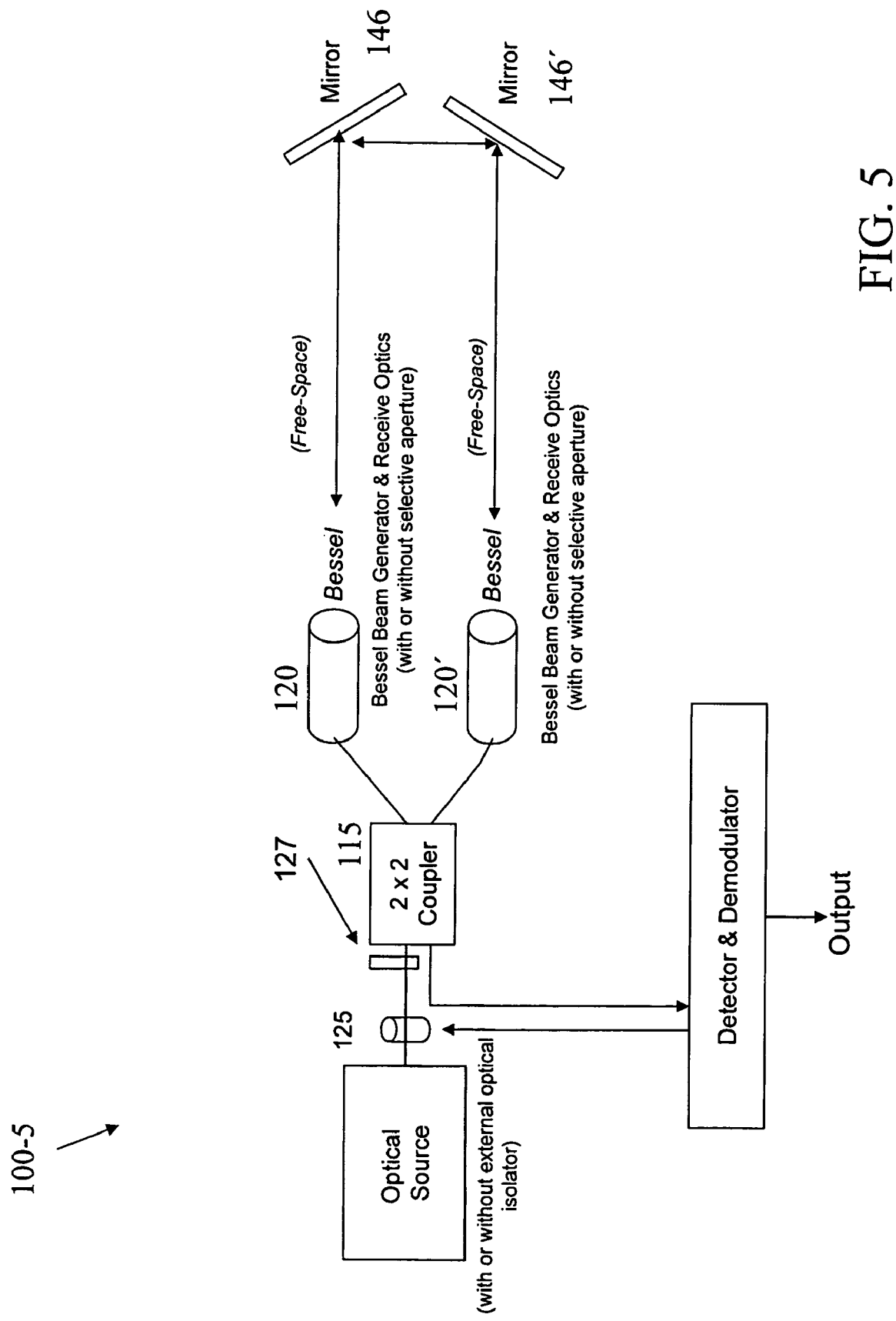
FIG. 5 is a schematic diagram illustrating a Bessel beam interferometer according to another exemplary embodiment of the invention.

Another exemplary embodiment 100-5 of the invention is illustrated in FIG. 5. The exemplary interferometer is a balanced path length ($L_S=L_R$) Sagnac interferometer. The device 100-5 includes an optical source 110 that generates a quasi-coherent or coherent optical source beam 112. The source beam is modulated by a phase modulator 125 and is then selectively polarized by polarizer 127. The beam output from the polarizer is input to beam divider 115 illustrated as a 2×2 fiber coupler, which produces a sensing optical beam 130 and a reference optical beam 135. Bessel beam generators 120, 120' are respectively located in the sensing optical beam path 130' and the reference optical beam path 135', both of which are free-space media, to generate diffraction less beams. Receiving optics (not shown) are utilized to propagate the beams along beam paths 130, 135' to exemplary corner reflectors 146, 146'. The beams are reflected back to and through beam combiner 115 and the interference pattern is detected and demodulated by component assembly 150. From there, output 170 is provided for analysis of the disturbance that was introduced into the sensing optical beam path. Feedback loop 160 is provided as before. An aperture component (not shown) may be provided in at least one of the sensing optical beam path and the reference optical beam path for propagating a selected light distribution.

Figure 6:
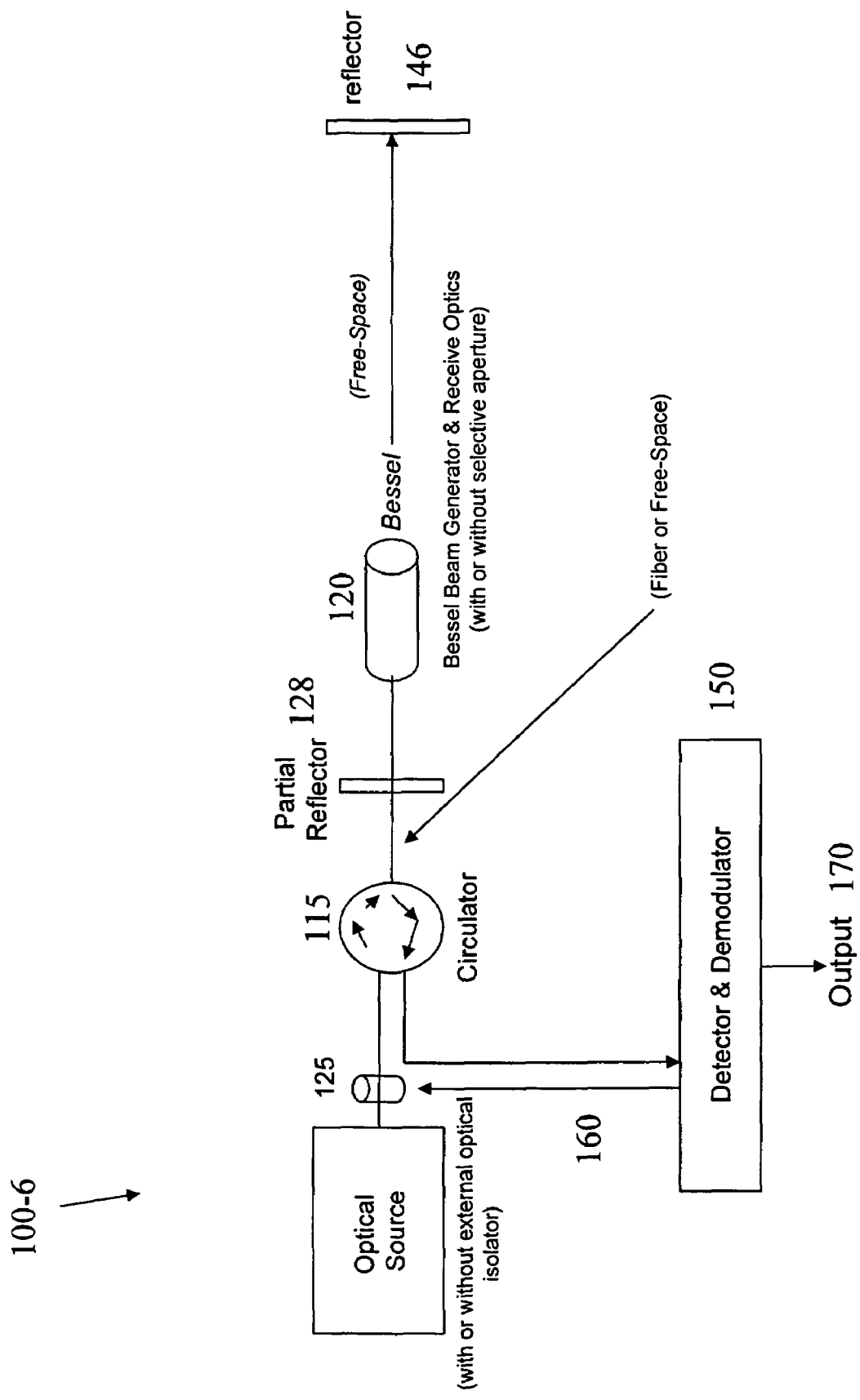
FIG. 6 is a schematic diagram illustrating a Bessel beam interferometer according to another exemplary embodiment of the invention.

FIG. 6 illustrates another exemplary device 100-6 according to the invention in the form of a Fabry-Perot interferometer. The device includes an optical source 110 that generates a quasi-coherent or coherent optical source beam 112. The beam is modulated by a phase modulator 125 and sent through optical circulator 115'. The outgoing beam is transmitted by partial reflector 128, which forms an end of a Fabry-Perot cavity, the other end of which is formed by retroreflector 146. A Bessel beam generator 120 is located within the Fabry-Perot cavity, which also includes receiving optics and intensity shaping and/or phase modifying apertures or components. The optical beam path 130' within the Fabry-Perot cavity is shown as a free-space path. Interfering light propagating out of the Fabry-Perot cavity enters circulator 115' and is directed to detector and demodulator assembly 150. Output 170 is provided for analysis and determination of a disturbance desired to be measured. As before, feedback loop 160 is provided.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

We claim:

1. An optical interferometer comprising:
   an optical source that generates an at least partially coherent optical source beam having a wavelength;
   means for generating diffracting, sensing light beam component and a diffracting, reference light beam component, that propagate over a sensing beam optical path and a reference beam optical path, respectively, from the source beam, wherein the sensing beam optical path includes a free-space optical path medium that traverses sensing beam phase-disruptive measurement environment;
   means for phase modulation of at least one of the light beam components;
   a detector positioned to detect an interference pattern produced by the interference between a non-diffracting, sensing light beam, component and the reference light beam components;
   a demodulator disposed in a detection path of the interferometer; and
   a non-diffracting light beam generator disposed to intercept the diffracting, sensing light beam component, wherein an output of the non-diffracting light beam generator is the non-diffracting, sensing light beam component that propagates through the phase-disruptive measurement environment.

2. The device of claim 1, wherein the non-diffracting light beam generator is a Bessel beam generator.

3. The device of claim 1, further comprising an optical isolator in optical communication with the optical source.

4. The device of claim 1, further comprising means for combining the interfering light beam components located optically upstream of the detector.

5. The device of claim 1, wherein the means for phase modulation comprises means for modulating the wavelength of the optical source beam.

6. The device of claim 1, wherein the sensing optical path has a length, $L_S$, and the reference optical path has a length, $L_R$.

7. The device of claim 6, wherein $L_S$ is equal to $L_R$.

8. The device of claim 6, wherein $L_S$ is not equal to $L_R$.

9. The device of claim 6, wherein the reference optical pat is a free-space optical path.

10. The device of claim 6, wherein the reference optical path is provided by a material medium.

11. The device of claim 10, wherein the material medium is an optical fiber.

12. The device of claim 1, wherein the optical source is a laser.

13. The device of claim 1, wherein the optical source beam has a Gaussian cross-sectional intensity profile.

14. The device of claim 1, further comprising an aperture component located in at least one of the sensing beam optical path and the reference beam optical path, said aperture component having an aperture for propagating one of a selected light distribution and phase of the substantially non-diffracting light beam component.

15. The device of claim 14, wherein the aperture component is a spatial light modulator having phase control.

16. The device of claim 14, wherein the selected light distribution of the substantially non-diffracting light beam component comprises substantially only a central bright region of the light beam component.

17. An optical measurement method, comprising:
   providing an at least partially coherent optical source beam;
   providing a diffracting, reference optical beam from the source beam that traverses a reference optical beam path;
   providing a diffracting, sensing optical beam from the source beam that traverses a sensing optical beam path, wherein the sensing optical beam path includes a free-space medium that traverses a sensing beam phase-disruptive measurement environment;
   converting the diffracting, sensing optical beam into a non-diffracting, sensing beam;
   reducing a noise component of a resultant interference signal by propagating the non-diffracting, sensing bean through the phase-disruptive measurement environment in the free-space medium; and
   interfering the non-diffracting, sensing optical beam and the reference optical beam to generate the resultant interference signal.

18. The method of claim 17, wherein the non-diffracting, sensing optical beam a Bessel beam.

19. The method of claim 17, comprising providing the reference optical beam path having a path length, $L_R$, comprising the sensing optical beam having a path length, $L_S$.

20. The method of claim 17, comprising providing the reference optical beam path having a path length, $L_R$, that is not equal to the sensing optical beam having a path length, $L_S$.

21. The method of claim 17, comprising modulating a phase component of at least one of the source beam and the reference optical beam.

22. The method of claim 17, comprising modulating a wavelength component of the source beam.

23. The method of claim 17, comprising providing a free-space beam path, for the reference optical beam.

24. The method of claim 17, comprising providing a fiber optic beam path for the reference optical beam.

25. The method of claim 17, wherein the optical source beam has a Gaussian cross-sectional intensity profile.

26. The method of claim 17, wherein the optical source beam has a Laguerre-Gaussian cross-sectional intensity profile.

27. The method of claim 17, further comprising aperturing the sensing optical beam to propagate a selected light distribution of the sensing optical beam.

28. The method of claim 27, further comprising propagating substantially only a central bright region of the sensing optical beam.

29. A Mach-Zehnder-type interferometer, comprising:
   an optical source that generates an at least partially coherent, diffracting, optical source beam having a wavelength;
   a beam divider in optical communication with the optical source beam adapted to generate a sensing optical beam and a reference optical beam;
   a sensing optical beam path having a free-space portion that traverses a sensing beam phase-disruptive measurement environment;
   a reference optical beam path;
   a phase modulator located in at least one of the reference optical beam path and the sensing optical beam path;
   a Bessel beam generator located in the sensing optical beam path prior to the free-space portion that generates a substantially non-diffracting, sensing beam; and
   a detector positioned in an optical path of the device for detecting an interference between the non-diffracting, sensing beam and the reference beam.

30. The interferometer of claim 29, further comprising a beam combiner in optical communication with the sensing optical beam and the reference optical beam, located optically upstream of the detector.

31. The interferometer of claim 29, further comprising an aperture component in at least one of the sensing optical beam path and the reference optical beam path having an aperture for propagating a selected light distribution.

32. The interferometer of claim 29, wherein the sensing optical beam path and the reference optical beam path have an equal path length.

33. The interferometer of claim 29, further comprising an optical isolator in optical communication with the optical source.

34. The interferometer of claim 29, further comprising a feedback loop between the signal output point and the phase modulator.

* * * * *

UNITED STATES PATENT AND TRADEMARK OFFICE
CERTIFICATE OF CORRECTION

PATENT NO.         : 7,557,930 B2
APPLICATION NO.    : 10/996930
DATED              : July 7, 2009
INVENTOR(S)        : Walter V. Werner and Park E. Hays It is certified that error appears in the above-identified patent and that said Letters Patent is hereby corrected as shown below:

Please correct the typographical error as follows:

Column 7, claim 1, line 49, insert -- a -- between -- generating -- and -- diffracting --.

Column 7, claim 1, line 55, insert -- a -- between -- traverses -- and -- sensing --.

Column 8, claim 9, line 19, delete "pat" and insert -- path --.

Column 8, claim 17, line 57, delete "bean" and insert -- beam --.

Column 8, claim 18, line 64, insert -- is -- between -- beam -- and -- a --.

Column 8, claim 19, line 66, delete "comprising."

Column 8, claim 19, line 67, insert -- that is equal to -- between -- LR -- and -- the --.

Column 8, claim 19, line 67, insert -- path -- between -- beam -- and -- having --.

Signed and Sealed this

Twenty-second Day of September, 2009

David J. Kappos
*Director of the United States Patent and Trademark Office*